(12) United States Patent
Ahlstrom et al.

(10) Patent No.: US 6,327,618 B1
(45) Date of Patent: Dec. 4, 2001

(54) RECOGNIZING AND PROCESSING CONFLICTS IN NETWORK MANAGEMENT POLICIES

(75) Inventors: John K. Ahlstrom, Cupertino; Stephen I. Schleimer, San Jose, both of CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/205,831

(22) Filed: Dec. 3, 1998

(51) Int. Cl.⁷ .................................................. G06F 15/173
(52) U.S. Cl. .......................... 709/223; 709/221; 709/222; 707/5; 370/254
(58) Field of Search ........................ 395/712; 370/254; 707/5; 709/221, 222, 223

(56) References Cited

U.S. PATENT DOCUMENTS

| | | | |
|---|---|---|---|
| 5,557,747 | * 9/1996 | Rogers et al. | 709/223 |
| 5,797,128 | * 8/1998 | Birnbaum | 707/5 |
| 5,872,928 | * 2/1999 | Lewis et al. | 709/222 |
| 5,889,953 | * 3/1999 | Thebaut et al. | 709/221 |
| 6,009,274 | * 12/1999 | Fletcher et al. | 395/712 |
| 6,064,656 | * 5/2000 | Angal et al. | 370/254 |
| 6,167,445 | 12/2000 | Gai et al. . | |

OTHER PUBLICATIONS

Kumar, Vipin, et al., "Algorithms for Constraint Satisfaction Problems: A Survey", AI Magazine, 13(1):32–44, 1992.

B. Aiken, et al., "Network Policy and Services: A Report of a Workshop on Middleware", RFC 2768, Feb. 2000, pp. 1–29.

D. Durham, et al., "The COPS (Common Open Policy Service) Protocol", RFC 2748, Jan. 2000, pp. 1–38.

\* cited by examiner

*Primary Examiner*—Ayaz Sheikh
*Assistant Examiner*—Frantz Blanchard Jean
(74) *Attorney, Agent, or Firm*—Hickman Palermo Truong & Becker LLP; Christopher J. Palermo; Craig G. Holmes

(57) ABSTRACT

A method and apparatus are provided for recognizing and processing conflicts in policies that govern a policy-based system. The method and apparatus may be implemented as a policy verifier that acts upon one or more policies. Each policy is formally defined and comprises a condition and a consequent, each of which are further formally defined in terms of component elements. A conflict among two or more policies is formally defined to occur when the condition of a first policy and the condition of a second policy may be simultaneously true, and when the consequent of the first policy and the consequent of the second policy may not be carried out simultaneously. When a policy conflict is detected, the conflict is resolved by bringing it to the attention of a user or external system, and receiving information that corrects one of the policies or specifies a precedence relationship among the policies.

39 Claims, 5 Drawing Sheets

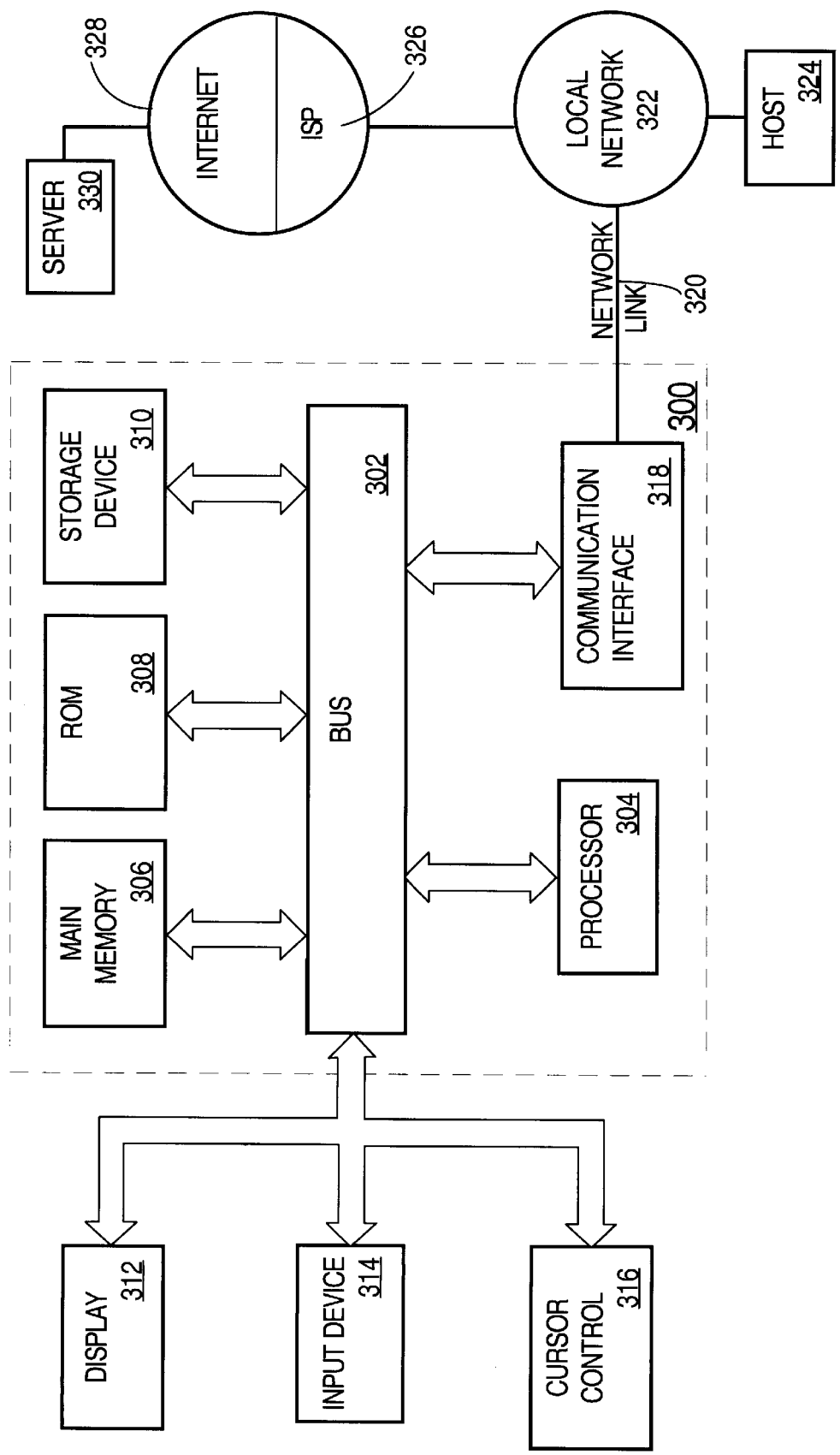

RECOGNIZING AND PROCESSING CONFLICTS IN NETWORK MANAGEMENT POLICIES

FIELD OF THE INVENTION

The present invention relates to data processing. The invention relates more specifically to computer systems or software systems that manage policy-based systems, and which can recognize and process conflicts in policies that control the policy-based system.

BACKGROUND OF THE INVENTION

Computer networks have become ubiquitous in the home, office, and industrial environment. As computer networks have grown ever complex, automated mechanisms for organizing and managing the networks have emerged. These mechanisms are generally implemented in the form of one or more computer programs, and are generically known as network management systems or applications.

FIG. 1 is a simplified diagram of a network 100 that is managed by a network management station 10. The network 100 comprises one or more network devices 102, such as switches, routers, bridges, gateways, and other devices. Each network device 102 is coupled to another network device 102, or to one or more end stations 120. Each end station 120 is a terminal node of the network 100 at which some type of work is carried out. For example, an end station 120 is a workstation, a printer, a server, or similar device.

Each network device 102 executes an operating system 110. An example of such an operating system is the Internetworking Operating System (IOS) commercially available from Cisco Systems, Inc. Each network device 102 also executes one or more applications 112 under control of or embedded within the operating system 110. The operating system 110 supervises operation of the applications 112 and communicates over network connections 104 using an agreed-upon network communication protocol, such as Simple Network Management Protocol (SNMP).

Each device 102 stores information about its current configuration, and other information, in a one or more information bases (IBs) such as one or more Management Information Bases (MIBs) 114. Information in an MIB 114 is organized in a manner appropriate for that IB, for example, in one or more MIB variables. The network management station 10 can use means appropriate to each kind of network device 102 and send it appropriate commands to read or alter information in its information bases. For example, network management station 10 can send "fetch" and "set" commands to the device 102 in order to retrieve or set values of MIB variables. Examples of MIB variables include sysObjectID and sysDescr.

Preferably the network management station 10 is a general-purpose computer system of the type shown and described further herein in connection with FIG. 3. The network management station 10 executes one or more software components that carry out the functions shown in block diagram form in FIG. 1. For example, the network management station 10 executes a basic input/output system (BIOS) 20 that controls and governs interaction of upper logical layers of the software components with hardware of the network management station. An example of a suitable BIOS is the Phoenix ROM BIOS. The network management station 10 also executes an operating system 30 that supervises and controls operation of upper-level application programs. An example of a suitable operating system is the Microsoft Windows NT® operating system. The network management station 10 may also execute other operating systems that may not require a BIOS 20, such as UNIX-type operating systems, microkernel-based operating systems, etc.

The network management station 10 executes an asynchronous network interface (ANI) program 50 under control of the operating system 30. The ANI 50 provides an interface to the network 100 and communicates with the network using SNMP or another agreed-upon protocol. The ANI 50 provides numerous low-level services and functions for use by higher-level applications.

The network management station 10 executes a network management system 40 that interacts with an information base 60 containing information about the managed network 100. This information base may be one or more data bases, one or more directories, one or more flat-files, or any other convenient storage mechanism or mechanisms. The network management system 40 is an example of a network management application. Using a network management application, a manager can monitor and control network components. For example, a network management application enables a manager to interrogate devices such as host computers, routers, switches, and bridges to determine their status, and to obtain statistics about the networks to which they attach. The network management application also enables a manager to control such devices by changing routes and configuring network interfaces. Examples of network management applications are CiscoWorks, CiscoWorks 2000, and CiscoView, each of which is commercially available from Cisco Systems, Inc.

The ANI 50 and network management system 40 need not execute or reside on the same physical computer. They may execute on different machines.

The behavior of some network management applications or network devices 102 may be governed by one or more abstract policies. A network management policy expresses a business goal for use of the network; the network management application can convert the policy into instructions to network devices, such as switches, routers, firewalls, and other hardware and software, to implement the policy. An example of a policy is: "All administrative assistants may use the World Wide Web only between 11 a.m. and 3 p.m., Monday through Friday." A system that can receive and act on such policies is sometimes called a policy-based network management system.

Policy-based management is used in other, specific contexts within the broad field of network management. For example, Cisco Centri Firewall software product, commercially available from Cisco Systems, Inc. of San Jose, Calif., is a policy-driven product. The use of policies to control a firewall is disclosed in co-pending U.S. patent application Ser. No. 60/074945, filed Feb. 17, 1998, entitled "Graphical Network Security Policy Management," and naming Scott L. Wiegel as inventor.

Other information about policy-based networking is described in CiscoAssure Policy Networking: Enabling Business Applications through Intelligent Networking, http://www.cisco.com/warp/public/734/capn/assur_sd.htm (posted Jun. 13, 1998); CiscoAssure Policy Networking End-to-End Quality of Service, http://www.cisco.com/warp/public/734/capn/caqos_wp.htm (posted Jun. 24, 1998); Delivering End-to-End Security in Policy-Based Networks, http://www.cisco.com/warp/public/734/capn/deesp_wp.htm (posted Sep. 11, 1998); User Registration and Address Management Services for Policy Networking, http://www.cisco.com/warp/public/734/capn/polnt_wp.htm (posted Sep. 11, 1998); CiscoAssure User Registration Tool, http://www.cisco.com/warp/public/734/capn/caurt_ai.htm (posted Oct. 8, 1998).

The ease by which policy-based network management systems permit a user or administrator to create network management policies is also a disadvantage of such systems. When a large number of policies is developed, a risk of damaging the network, through conflicting policies or non-conflicting policies that achieve different goals, is created. There is a need for a system, mechanism or process of preventing conflicting policies from damaging a network.

For example, conflicting policies may leave a network or other policy-based system in an inconsistent state, or may make it difficult or impossible to understand the effects of the set of policies. A set of policies may be difficult or impossible to understand even if it is possible to understand the effect of each individual policy in isolation. These problems exist, in part, because past systems have provided no formal way to define the structure of a policy or a policy conflict. Past systems may provide a grammar in which a policy must be expressed, but in past approaches there is no formal definition of a policy, or of a conflict, or of how to resolve a conflict Based on the foregoing, there is a clear need in this field for a formal way to define a policy.

There is also a need to formally define and determine when one policy conflicts with another policy.

There is a further need to recognize a policy conflict and provide a way for an administrator or other user of the system to resolve the policy conflict before the conflicting policies damage the system under management.

There is a particular need for such a system, mechanism or process that can be used in the context of a network management application that manages a network of data communication devices or computer devices.

SUMMARY OF THE INVENTION

The foregoing needs and objectives, and other needs and objectives that will become apparent in the following description, are achieved by the present invention, which comprises, in one aspect, a method of recognizing and resolving a conflict among at least a first policy and a second policy that govern a policy-based system, comprising the computer-implemented steps of receiving the first policy and the second policy, wherein the first policy and the second policy are defined according to a formal policy definition; testing whether the first policy and the second policy conflict, according to a set of conflict tests; and when the first policy and the second policy conflict, resolving the conflict among the policies.

One feature of this aspect, is that the step of receiving comprises the steps of receiving the first policy and the second policy, wherein each policy comprises at least one condition and one consequent for each condition. Another feature is that receiving comprises the steps of receiving a first network management policy and a second network management policy, wherein each policy comprises at least one condition and one consequent for each condition, and wherein the consequent indicates one of the following: to allow information to pass through the network; to deny information from passing through the network; to mark information passing through the network; or to initiate a network service.

According to another feature, the step of receiving comprises the steps of receiving the first policy and the second policy, wherein each condition of each policy comprises a Boolean expression that relates a condition category to a condition element. A related feature is that the step of receiving comprises the steps of receiving the first policy and the second policy, wherein each condition of each policy comprises a Boolean expression that relates a condition category to a condition element, and wherein the condition element identifies a service type, a user type, or a time.

According to another feature, the step of testing comprises the steps of identifying a policy conflict when a first condition of the first policy and a second condition of the second policy conflict may be simultaneously true and when a first consequent of the first policy and a second consequent of the second policy may not be carried out simultaneously. In another feature, the step of resolving comprises the steps of displaying information that describes the conflict; and receiving modification information that modifies the first policy or the second policy so as to eliminate the conflict.

A related feature is that the step of resolving comprises the steps of displaying information that describes the conflict; and receiving precedence information that identifies whether the first policy or the second policy shall take precedence over the other.

In yet another feature, the step of receiving comprises the steps of receiving the first policy and the second policy, wherein each condition of each policy comprises a Boolean expression that relates a condition category to a condition element, and wherein the condition element identifies a source address, destination address or port.

In another aspect, the invention encompasses a computer-readable medium carrying one or more sequences of instructions for recognizing and resolving a conflict among at least a first policy and a second policy that govern a policy-based system, configured according to the foregoing steps.

In another aspect, the invention provides, in a network management system, a method of recognizing and resolving a conflict among at least a first network management policy and a network management second policy that govern operation of a network, comprising the computer-implemented steps of receiving the first network management policy and the second network management policy, wherein the first network management policy and the second network management policy are defined according to a formal policy definition; testing whether the first network management policy and the second network management policy conflict, according to a set of conflict tests; when the first network management policy and the second network management policy conflict, resolving the conflict among the policies; executing the first network management policy and the second network management policy to thereby modify behavior of the network.

In all of these aspects, each policy may comprise at least one condition and one consequent for each condition, wherein the consequent identifies a state that is to be established when the policy condition is satisfied. Further, each policy may comprise at least one condition and one consequent for each condition, and wherein the consequent identifies an action that is to be taken or attempted when the policy condition is satisfied.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a block diagram of a computer system that can be used to implement the network management station of FIG. 1 and other aspects of the invention.

DETAILED DESCRIPTION OF THE PREFERRED EMBODIMENT

Figure 1:
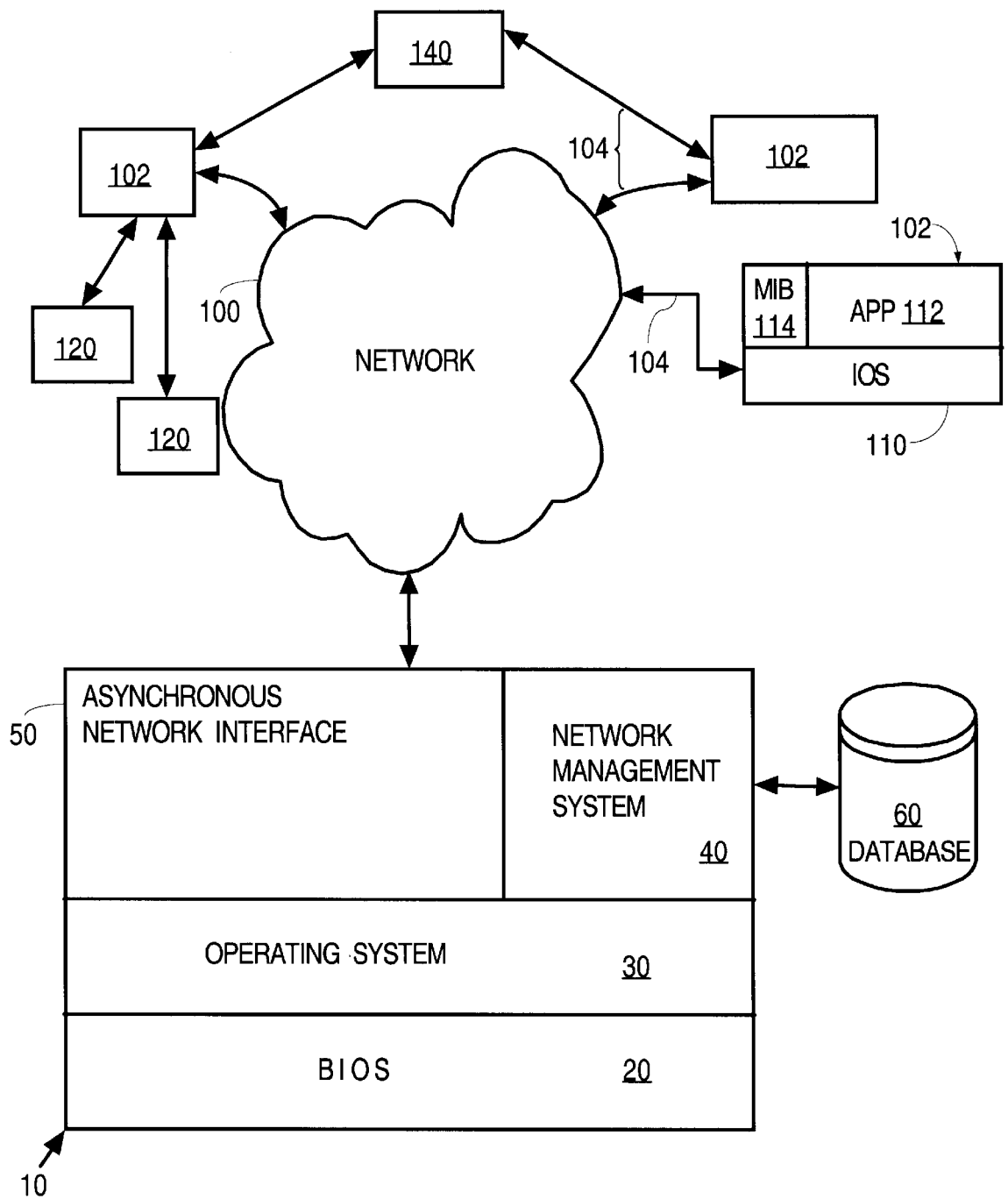
FIG. 1 is a simplified diagram of a network that is managed by a network management station.

A method and apparatus for recognizing and processing policy conflicts is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

OVERVIEW

One way to minimize damage to a policy-controlled system, arising from conflicts in the policies, is to discover, report and allow someone to resolve conflicting policies. A system that formally defines policy conflict may be used to check a set of policies for conflicts or inconsistencies, to discover them, and to report them. The system may also allow someone to resolve the conflict or inconsistency, for example, by changing one or more policies or specifying the order in which a set of conflicting policies is to be applied.

Accordingly, one aspect of the preferred embodiment provides a formal definition of policy conflict. Other aspects provide ways to discover, report and allow resolution of policy conflicts. Accordingly, a policy management system allows customers to lessen the probability and effect of conflicting policies in any policy-based system. In one exemplary embodiment, the invention is implemented in the context of a policy-based network management system. The invention is equally applicable, however, to any policy-based system.

In one embodiment, a policy conflict definition and resolution system operates in concert with a network management system. The system may be implemented as one or more computer programs, processes, objects, or routines. In this configuration, the system provides Policy-Based Networking.

Policy-Based Networking enables network administrators to specify network behavior in a collective, declarative manner at a high level of abstraction and granularity. Policy management makes it Possible, Safe and Comfortable to specify network behavior in this way. In this context, "Possible" means that the actions and states of affairs expressed in a policy can be implemented. "Safe" means that the actions and states of affairs expressed in multiple policies will not conflict with each other, will not damage the network, and not reduce the flow of traffic below desired/required levels. "Comfortable" means that the administrator may be confident that the changes are possible and safe.

When a policy-based networking system is used by human administrators, it may be inevitable that Policies will conflict with each other. Accordingly, the policy management system may point out conflicting policies and ask for a prioritization of the policies or a change in one or both policies adequate to remove the conflict.

Conflicts may be dependent on the capabilities of the actual hardware that is used in the network. For example, it may be true that actions a, b, and c can simultaneously be undertaken on device type M, but only a or b or c may be undertaken on device type R. Further, a policy may be self-conflicting. For example, the consequents of a policy may conflict on a device of type R and not on type M.

Preferably, the policy management system assists in the management of one or more Groups of network objects. In this context, "Group" means one or more things specified by the customer to the Policy Management System, for example, Users, IP addresses, switches, routers, device ports, or other things.

Groups can be Enumerated, wherein they contain the names of all the things in them (including other groups). Groups can be Dynamic, wherein they contain a definition of the things in the group. For example, Enumerated Group ThreeGuys=[User where Name in [Tom, Dick, Harry]];

Dynamic Group Engineering=[User where PrimaryJobTitle in [engineer, engineering tech]

DEFINITIONS OF POLICY AND CONFLICT

1. FORMAL DEFINITION OF POLICY

The policy management system manages at least one "Policy", which is a declarative statement of intention about how a policy-driven system shall be configured or behave. A policy may be expressed in terms of a Policy Condition and a Policy Consequent. When the Condition is met, the Consequent is performed.

More specifically, policy statements are declarative statements made by network administrators defining conditions and actions or states of affairs they want taken or established when the condition is fulfilled by something in the network. For example, a Policy is:

If source in [TrainingServers] & destination in [ClassRooms] & time between [700 & 1759] then VideoLT100

In one embodiment, there are two kinds of policies, depending on the nature of the consequent. Service Policies create services in the network; Usage Policies determine which services will be used when their conditions are satisfied. The issues of policy structure and conflict are the same for both of these kinds.

A. POLICY CONDITION

A Policy Condition is a Boolean expression defining the situation under which the policy system is to attempt to establish the consequent. The Condition is a Boolean expression that may comprise relations between Condition Categories and Condition Elements. Condition Categories may be predefined kinds of things that can be evaluated in conditions, for example, service, user, time, and other things. Condition Elements are customer-defined values of predefined (by Cisco or customers) categories of "things" in or about the network.

For example, in the Policy Condition "User in Engineers and service in MultiMediaSources," the Policy Condition Elements are "Engineers" and "MultiMediaSources".

The Policy Condition may be a set of Policy Condition Elements, one for each of the Policy Condition Element Types defined in the system. This is the canonical form of a policy. In many places in the system the policy will be represented as having only those Policy Condition Elements that are different from the default Policy Condition Element for the type. For example, the canonical form of all policies will include a Time element, the default value of which is "any". If a policy is to be effective any time, with no time constraints, then it can be entered, displayed, . . . without the "Time in ["any"] Policy Condition Element.

The Policy Condition Element Types may be User, SourceIP, SourceIP&Port, DestinationIP, DestinationIP&Port, IngressPort, Time, and Application. Other Policy Condition Element Types may be provided.

Preferably, Policy Condition Elements are Boolean expressions of the form

<Policy Condition Element Type><relation><values> where <relation> is selected from among (in, not in, equal, not equal, less than, less than or equal, greater than, greater than or equal). The element <values> is one or more values or a named Group of the same type as the Policy Condition Element Type. For example:

User in ["Tom", "Dick", "Mary"]

Time in [1100 to 1900]

Application=SAP

SourceIP&Port in SAPSources

A policy need not explicitly contain a Policy Condition Element for all Policy Condition Element Types. The system treats Policy Condition Elements for Policy Condition Element Types that are not explicit in the Policy Condition as always true.

The canonical form of a policy that is missing Policy Condition Elements is the policy plus, for each missing Policy Condition Element Type, a Policy Condition Element of the form <Policy Condition Element Type> in [any]. In this example, <Policy Condition Element Type> is the missing one, and "any" means "any possible value of the Policy Condition Element Type." Accordingly, the policy will be satisfied in all cases.

The Policy Condition of a policy is satisfied when all of the Policy Condition Elements are true.

B. POLICY CONSEQUENT

A Policy Consequent is a state of affairs that is to be brought about when the policy condition is satisfied, or an action that is to be taken or attempted when the policy condition is satisfied.

In one embodiment, in the context of a network management system, the Policy Consequents are Allow, Deny, Mark Packets, and Services defined in Service Policies. These consequents reflect what a network device is supposed to do with a packet of information traveling through the device when the corresponding policy condition is satisfied. Other Policy Consequents may be provided.

2. FORMAL DEFINITION OF POLICY CONFLICT

A Policy Conflict may occur. Two policies are in conflict if their conditions can be satisfied by the same set of circumstances and their consequents are not simultaneously possible. For example, the following two policies represent a Policy Conflict:

(1) If User in [John, Tom, Fred] Set TOS 3

(2) If User in [Tom, Dick, Harry] Set TOS 5

Thus, when a packet comes in from Tom, the conditions of two policies are satisfied, but they have conflicting consequents: set TOS 3 and set TOS 5. In this configuration, the condition of the system is unpredictable based solely on the policies.

Accordingly, a policy conflict is formally defined to occur when the Policy Conditions of two policies can be simultaneously satisfied, and if the Policy Consequents of the policies cannot be simultaneously produced.

This definition has two parts. The first part, that "the conditions of two policies conflict if both conditions can be satisfied by the same situation," means that for every pair of Policy Condition Elements of the same type in both policies, there is a value that can satisfy the Policy Condition Elements in both policies. The value "any" in a Policy Condition Element of a policy is defined as conflicting with any value in the corresponding Policy Condition Element in any other policy.

For two Policies not to conflict, it is necessary and sufficient that for at least one pair of corresponding Policy Condition Elements in the two policies is not both satisfied by the same value. For example, the policy If User in LucaEngineers & Time in [800 to 1700] then DenyInternet conflicts with the policy If IngressPort in Library then AllowInternet because the partial canonical forms of the policies are If IngressPort in ["any"] & User in LucaEngineers & Time in [800 to 1700] then DenyInternet If IngressPort in Library & User in ["any"] & Time in ["any"] then AllowInternet Accordingly, a LucaEngineer logging in from the library is denied access if the first policy is followed, but allowed access if the second policy is followed. The conditions of the two policies are satisfied when a LucaEngineer logs in at the library between 8 AM and 5 PM, but the two consequents cannot be simultaneously produced.

A pair of Policy Condition Elements of the same type may conflict in any of three cases. First, a conflict exists if the Policy Condition Elements are the same. Second, a conflict exists if the relation contains an equality construct, and if the enumerations of the policies intersect and both enumerations are non-null. In this context, an "equality construct" means a relation of Equal, Less Than Or Equal, Greater Than Or Equal, or In. Third, a conflict exists if the relation contains inequality and if the enumerations of the policies do not intersect or if either enumeration is null. In this context, "inequality" means a relation of Not Equal, Less Than, Greater Than, or Not In.

For example, consider the following three (3) policies.

1. If user in Engineers and time in WorkHours, then DenyInternetAccess.

2. If source in LibraryPorts, then AllowInternetAccess.

3. If user in LucaFolk, then AllowInternetAccess.

Policy 1 conflicts with policy 2, because the system cannot determine which policy should govern the handling of an engineer at a library port. Further, policy 1 conflicts with policy 3 when a user who is in LucaFolk is also within Engineers.

3. EXAMPLE POLICY

Another example Policy Statement is:

"If service in CompanyMeetingSources & destination in CompanyMeetingViewers & time in CompanyMeetingTimeSlot then JitterFreeMPEG2." The Policy Condition is: "service in CompanyMeetingSources & destination in CompanyMeetingViewers & time in CompanyMeetingTimeSlot." The Policy Condition Element(s) are: "service in CompanyMeetingSources, destination in CompanyMeetingViewers, time in CompanyMeetingTimeSlot." The Policy Condition Element Type(s) are: service, user, time. The Policy Consequent is: JitterFreeMPEG2.

This policy may mean, for example, that when there is a flow of network packets between a CompanyMeetingSource and a CompanyMeetingViewer during the CompanyMeetingTimeSlot, that flow is to be given the Quality of Service (QoS) called "JitterFreeMPEG2". This QoS may provide, for example, sufficient bandwidth and delay parameters to allow the network to transmit jitter-free MPEG2 quality video information.

In one embodiment, there is a mechanism to determine what to do when it is impossible to take the action or bring about the state of affairs in a consequent.

4. POLICY CONFLICT NOTIFICATION AND RESOLUTION

Administrators may generate tens to hundreds of policies for their networks. Each policy describes an action to be taken or a situation to be established when a condition is met. Together, the policies may not make sense; they may contradict each other, or they may not be possible to do.

When policies conflict, administrators may be informed of the conflict and given tools to resolve the conflict. In some cases, resolution may involve changing one policy or the other so the conflict is eliminated. In other cases, resolution may involve the administrator telling the policy management system which policy to give precedence. For example, consider exemplary policies (1) and (2):

(1) If User in Engineers and time in [8 AM to 5 PM] then disallowInternetAccess (2) If source in Library then allowInternetAccess.

If "source" is a User who is among the Engineers, and "source" is in Library, and the time is 12 PM, then policy (1) is in conflict with policy (2). This conflict could be resolved by adding a relation to policy (1), as follows:

If User in Engineers and source not in Library and time in [8 AM to 5 PM] then disallowInternetAccess Thus, to resolve conflict between two polices, an administrator may change one or both of them. Alternatively, the administrator can supply the system with information on the relative priorities of the policies. For example, the conflict above could be resolved by the administrator telling the system, to give precedence to policy (2). In another alternative, conflict resolution is accomplished by the system keeping a partial order of all policies, or of all conflicting policies.

METHOD OF RECOGNIZING AND PROCESSING OF CONFLICTS IN NETWORK MANAGEMENT POLICIES

Figure 2A:
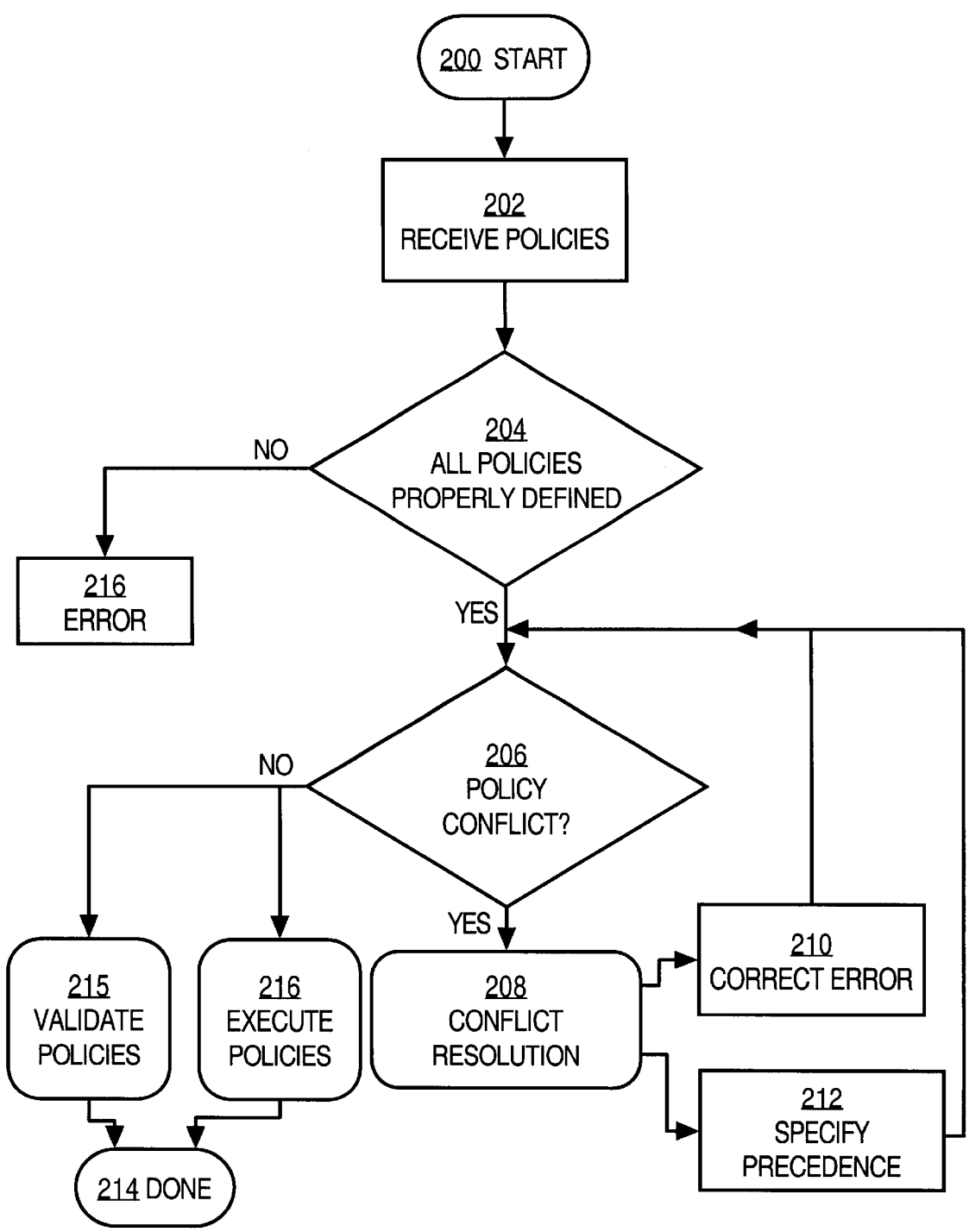
FIG. 2A is a flow diagram of a process of verifying a network management policy.

FIG. 2A is a flow diagram of a method of recognizing and processing conflicts in policies that govern a policy-based system. The process of FIG. 2A may be implemented, for example, in the form of one or more computer software components. The software components may form a part of a network management system of the type described above, in connection with FIG. 1. For example, an implementation is a policy verifier within a network management program.

The process initiates at block 200. In block 202, the policy verifier receives one or more policies. Block 202 may involve, for example, reading one or more source definitions of policies from a mass storage device, or receiving policy definitions in a partially compiled, tokenized or p-code format. Block 202 may also involve receiving metadata related to the policies, for example, a partial order of the policies that may be used in resolving policy conflicts, as described further below.

In block 204, the policy verifier tests whether all the policies are properly defined according to pre-determined criteria. Block 204 may involve the steps of testing whether each policy is expressed according to a formal policy definition of the type described above. Block 204 of FIG. 2A may involve the steps of FIG. 2B, which is described further below.

If one or more of the policies is not properly defined, then control is passed to block 216, in which error processing is done. The error processing steps may involve reporting the error in policy definition, for example, by displaying an error message to the user or writing a description of the error in a log file. The policy verifier may then terminate operation, or may continue at block 206.

In block 206, the policy verifier tests whether a policy conflict exists within the policies that were received in block 202. Block 206 may involve the steps set forth in FIG. 2C, which is described further below. If no policy conflict is found, then the policies are validated or executed within the policy-based system, as shown by block 215 and block 216. Block 215 may involve verifying that the policies are capable of application to the network or the network management system. Block 216 may involve applying the policies to a network management system, for example, re-configuring one or more parameters of one or more network devices in response to the rules represented by the policies. Block 216 may also involve parsing, interpreting, or compiling source policy definitions into a representation that can be used by the network management system.

If a policy conflict is found, then as shown by block 208, the policy verifier carries out resolution of the policy conflict. Block 208 may be executed iteratively for each policy conflict that is found in the test of block 206, so that all possible combinations of policies are tested for potential conflict. Block 208 may involve, for example, correcting the policy conflict or "error", as shown by block 210, or specifying a precedence of the conflicting policies, as shown by block 212. For example, block 210 may involve displaying the conflicting policies to a user and prompting a user to correct one or both policies so that they do not conflict. Correction of an error that causes a policy conflict may involve adding a relation to one policy, deleting a relation from another policy, or modifying one or both policies so that their conditions are logically consistent. The display and correction may be carried out using a text-based or graphical policy editor.

Similarly, block 212 may involve displaying two or more conflicting policies to a user and prompting the user to choose which of the policies is to take precedence over the other policies. Block 212 may also involve an automated mechanism. The system may receive information that defines a partial order of the policies. The system may process the partial order at run-time to result in a graph or other representation of the order in which the policies are to be implemented.

The conflict resolution process of block 208 does not require user intervention. The conflict resolution may be completely automated and invisible to the user. For example, block 208 may involve passing information that describes a policy conflict to another program, process or system that carries out automated conflict resolution.

The conflict resolution process of block 208 may also involve the steps of reporting to the user, or to another system, the consequences of a particular policy conflict resolution that is selected by the user or that system. For example, the policy verifier or other elements of the system can immediately check the revised policies against all other policies and report potential conflicts before the revised policies are made persistent in the system. In this manner, the user can play out various "what if" scenarios before settling on one particular conflict resolution scheme.

When conflict resolution of block 208 is completed, control may be returned to block 206 to repeat the policy conflict test. Alternatively, the system may proceed to block 216 in which the corrected or re-ordered policies are executed.

Figure 2B:
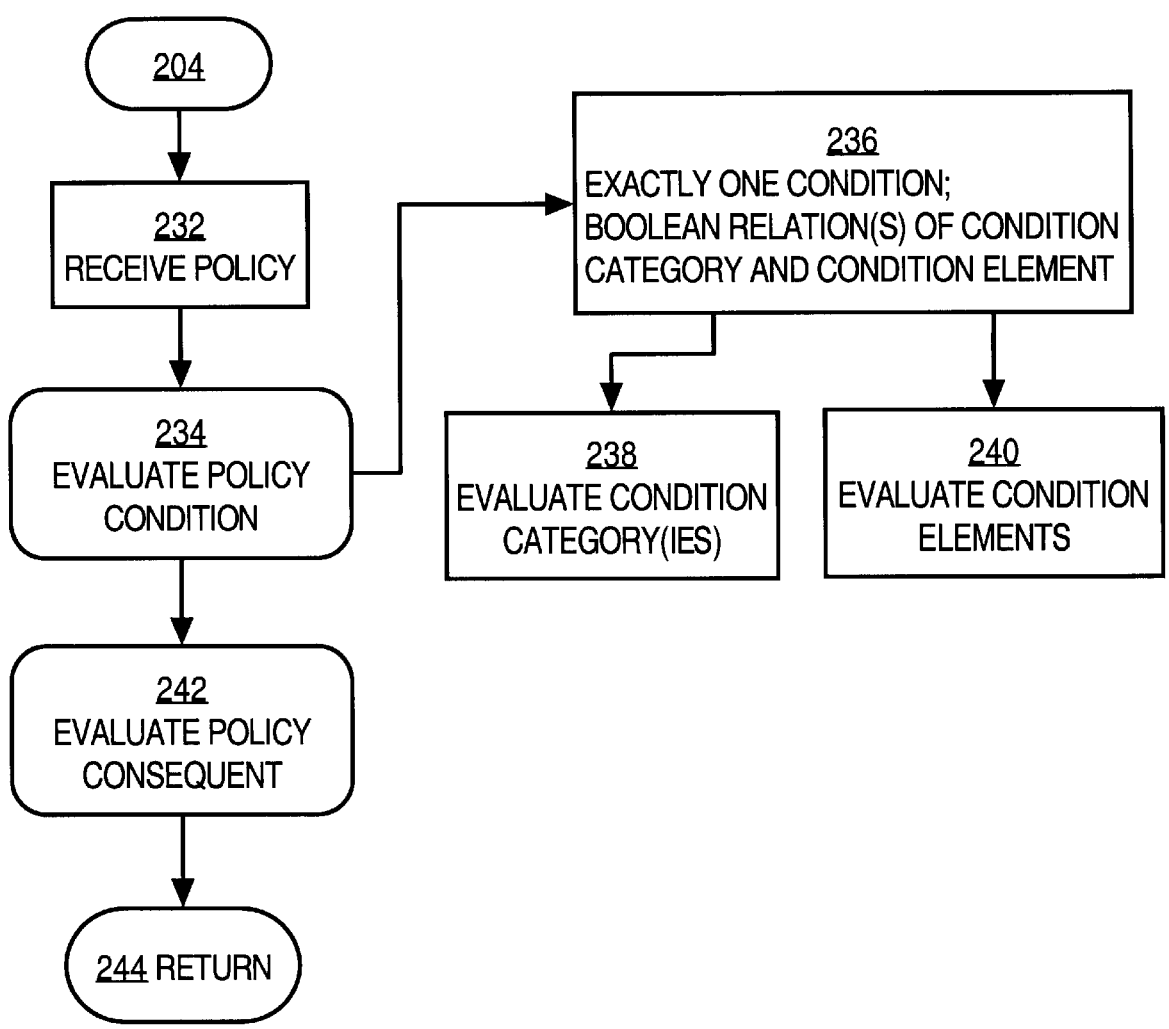
FIG. 2B is a flow diagram of an embodiment of certain steps in the process of FIG. 2A.

FIG. 2B is a flow diagram of a process of testing whether policies are properly defined that may be used, in one embodiment, to implement the test of block 204 of FIG. 2A. Referring now to FIG. 2B, in block 232 a policy is received. Block 232 may involve the steps of receiving, at the policy verifier, one or more policies to be evaluated for semantic and formal correctness. Several tests are applied, in the preferred embodiment.

For example, the policy verifier may evaluate each policy to determine whether it has both a Policy Condition and a Policy Consequent, whether each Policy Condition is properly defined, and whether each Policy Consequent is properly defined. As shown in block 234, each Policy Condition is evaluated. The evaluation of block 234 may involve the steps, as shown in block 236, of determining whether the Policy contains exactly one Policy Condition. The policy verifier may also determine whether the Policy Condition expresses one or more Boolean relations among Condition Categories and Condition Elements. As shown by block 238, this may involve identifying and evaluating each Condition Category, to test whether it meets pre-defined criteria for the form and content such Condition Categories. The Condition Categories described above may be used. Similarly, block 240 may involve identifying and evaluating each Condition Element against other pre-defined criteria for the form and content of Condition Elements. The Condition Elements described above may be used, for example.

The policy verifier may also evaluate the Policy Consequent, as shown by block 242. This may involve testing whether the Policy Consequent can actually be executed by the policy-based system or contains values that are known to that system. Other pre-defined criteria may be used.

Figure 2C:
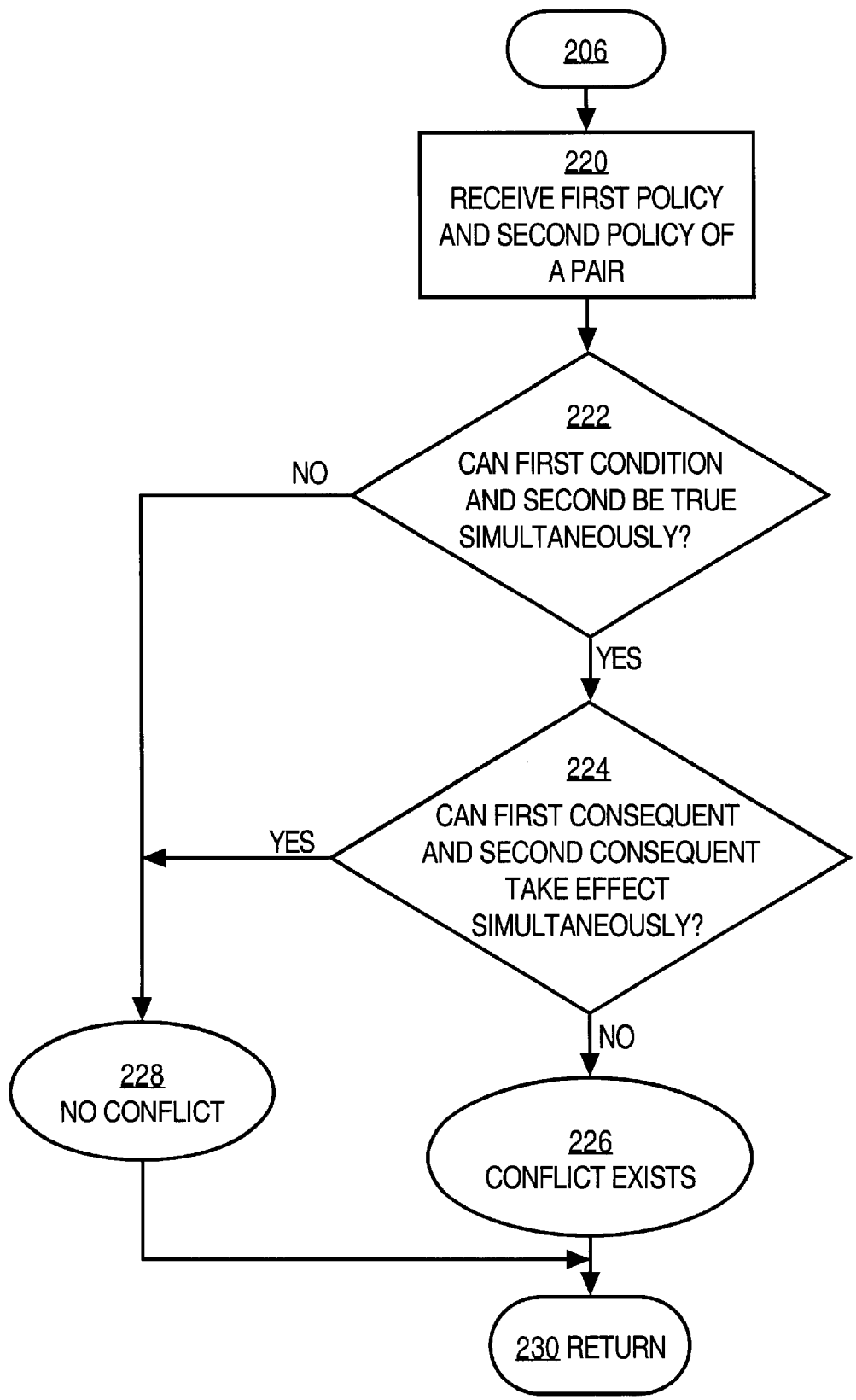
FIG. 2C is a flow diagram of an embodiment of certain other steps in the process of FIG. 2A.

FIG. 2C is a flow diagram of a process of testing whether policies conflict that may be used, in one embodiment, to implement the test of block 206 of FIG. 2A.

As shown in block 220, to determine whether policies conflict, the policy verifier receives a first policy and a second policy that comprise a pair of policies. Block 220 is meant to convey the notion that policy conflicts are determined by successively comparing one policy with another. Thus, the steps of FIG. 2C may be carried out iteratively for each policy in the system, successively comparing each policy to each other policy that is defined.

As noted above, each policy contains exactly one conditional expression. Therefore, for the pair of policies, the policy verifier tests whether the condition of the first policy and the condition of the second policy may be true simultaneously, as shown in block 222. If both policies may not be simultaneously true, then no conflict exists among the policies, as shown by block 228. In that case, the process of FIG. 2C may simply terminate or return to the prior process of FIG. 2A, as shown by block 230. Alternatively, the process of FIG. 2C may continue to iteratively consider other policies in the system.

If the test of block 222 is true, then a potential policy conflict exists. As described above, each policy must have exactly one consequent. In block 224, the policy verifier tests whether the first consequent and the second consequent may take effect or be carried out simultaneously. If both consequents can be carried out concurrently, then no conflict exists, and control is passed to block 228. The process of FIG. 2C may simply terminate or return to the prior process of FIG. 2A, as shown by block 230. Alternatively, the process of FIG. 2C may continue to iteratively consider other policies in the system.

If both consequents cannot take effect simultaneously, then the test of block 224 is false. Accordingly, a conflict exists, as indicated by block 226. At this point, the process of FIG. 2C will terminate or return to the prior process of FIG. 2A, as shown by block 230.

A policy, of course, also may be internally inconsistent or contain an internal conflict. For example, a policy can express two inconsistent Boolean sub-expressions. This may occur in long policies that are rapidly prepared without adequate logical checking. Accordingly, in an alternate embodiment, the policy verifier checks each policy for internal logical conflicts, notifies a user or other system, and resolves the conflicts, in the manner described above.

HARDWARE OVERVIEW

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 maybe coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for recognizing and processing conflicts in policies that govern a policy-based system. According to one embodiment of the invention, recognizing and processing conflicts in policies is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for recognizing and processing conflicts in policies as described herein.

The received code may be executed by processor 304 as it is received, and/or stored in storage device 310, or other non-volatile storage for later execution. In this manner, computer system 300 may obtain application code in the form of a carrier wave.

In the foregoing specification, the invention has been described with reference to specific embodiments thereof It will, however, be evident that various modifications and changes may be made thereto without departing from the broader spirit and scope of the invention. The specification and drawings are, accordingly, to be regarded as illustrative or exemplary rather than restrictive.

What is claimed is:

1. A method of recognizing and resolving a conflict among at least a first policy and a second policy that govern a policy-based system, comprising the computer-implemented steps of:

receiving the first policy and the second policy, wherein the first policy and the second policy are defined according to a formal policy definition;

verifying that the first policy and the second policy each conform to the formal policy definition by performing the steps of:

verifying that the first policy and the second policy each contain exactly one condition; and verifying that each condition expresses one or more Boolean relations among one or more condition categories and one or more condition elements;

testing whether the first policy and the second policy conflict, according to a set of conflict tests; and when the first policy and the second policy conflict, resolving the conflict among the policies.

2. The method recited in claim 1, wherein each policy comprises at least one consequent for each condition.

3. The method recited in claim 2, wherein the at least one consequent indicates one of the following: to allow information to pass through the policy-based system; to deny information from passing through the policy-based system; to mark information passing through the policy-based system; or to initiate a service.

4. The method recited in claim 2, wherein the at least one consequent identifies a state that is to be established when the condition is satisfied.

5. The method recited in claim 2, wherein the at least one consequent identifies an action that is to be taken or attempted when the condition is satisfied.

6. The method recited in claim 1, wherein at least one condition element identifies a service type, a user type, or a time.

7. The method recited in claim 1, wherein at least one condition element identifies a source address, a destination address or a port.

8. The method recited in claim 1, wherein the step of testing comprises the steps of:

identifying the conflict when a first condition of the first policy and a second condition of the second policy may be simultaneously true and when a first consequent of the first policy and a second consequent of the second policy may not be carried out simultaneously.

9. The method recited in claim 1, wherein the step of resolving comprises the steps of:

displaying information that describes the conflict; and receiving modification information that modifies the first policy or the second policy so as to eliminate the conflict.

10. The method recited in claim 1, wherein the step of resolving comprises the steps of:

displaying information that describes the conflict; and receiving precedence information that identifies whether the first policy or the second policy shall take precedence over the other.

11. The method recited in claim 1, further comprising the steps of:

when either the first policy or the second policy is not defined according to the formal policy definition, generating an error.

12. In a network management system, a method of recognizing and resolving a conflict among at least a first network management policy and a second network management policy that govern operation of a network, comprising the computer-implemented steps of:

receiving the first network management policy and the second network management policy, wherein the first network management policy and the second network management policy are defined according to a formal policy definition;

verifying that the first network management policy and the second network management policy each conform to the formal policy definition by performing the steps of:

verifying that the first network management policy and the second network management policy each contain exactly one condition; and verifying that each condition expresses one or more Boolean relations among one or more condition categories and one or more condition elements;

testing whether the first network management policy and the second network management policy conflict, according to a set of conflict tests; and when the first network management policy and the second network management policy conflict, resolving the conflict among the network management policies.

13. The method recited in claim 12, wherein each network management policy comprises at least one consequent for each condition, and wherein the at least one consequent indicates one of the following: to allow information to pass through the network; to deny information from passing through the network; to mark information passing through the network; or to initiate a network service.

14. The method recited in claim 12, wherein the step of testing comprises the steps of:

identifying the conflict when a first condition of the first network management policy and a second condition of the second network management policy may be simultaneously true and when a first consequent of the first network management policy and a second consequent of the second network management policy may not be carried out simultaneously.

15. The method recited in claim 12, wherein the step of resolving comprises the steps of:

displaying information that describes the conflict; and receiving modification information that modifies the first network management policy or the second network management policy so as to eliminate the conflict, or receiving precedence information that identifies whether the first network management policy or the second network management policy shall take precedence over the other.

16. A computer-readable medium carrying one or more sequences of instructions for recognizing and resolving a conflict among at least a first policy and a second policy that govern a policy-based system, wherein execution of the one or more sequences of instructions by one or more processors causes the one or more processors to perform the steps of:

receiving the first policy and the second policy, wherein the first policy and the second policy are defined according to a formal policy definition;

verifying that the first policy and the second policy each conform to the formal policy definition by performing the steps of:

verifying that the first policy and the second policy each contain exactly one condition; and verifying that each condition expresses one or more Boolean relations among one or more condition categories and one or more condition elements;

testing whether the first policy and the second policy conflict, according to a set of conflict tests; and when the first policy and the second policy conflict, resolving the conflict among the policies.

17. The computer-readable medium recited in claim 16, wherein each policy comprises at least one consequent for each condition.

18. The computer-readable medium recited in claim 17, wherein the at least one consequent indicates one of the following: to allow information to pass through the policy-based system; to deny information from passing through the policy-based system; to mark information passing through the policy-based system; or to initiate a service.

19. The computer-readable medium recited in claim 17, wherein the at least one consequent identifies a state that is to be established when the condition is satisfied.

20. The computer-readable medium recited in claim 17, wherein the at least one consequent identifies an action that is to be taken or attempted when the condition is satisfied.

21. The computer-readable medium recited in claim 16, wherein the step of testing comprises instructions which, when executed by one or more processors, cause the one or more processors to carry out the steps of:

identifying the conflict when a first condition of the first policy and a second condition of the second policy may be simultaneously true and when a first consequent of the first policy and a second consequent of the second policy may not be carried out simultaneously.

22. The computer-readable medium recited in claim 16, wherein the step of resolving comprises instructions which, when executed by one or more processors, cause the one or more processors to carry out the steps of:

displaying information that describes the conflict; and receiving modification information that modifies the first policy or the second policy so as to eliminate the conflict.

23. The computer-readable medium recited in claim 16, wherein the step of resolving comprises instructions which, when executed by one or more processors, cause the one or more processors to carry out the steps of:

displaying information that describes the conflict; and receiving precedence information that identifies whether the first policy or the second policy shall take precedence over the other.

24. An apparatus for recognizing and resolving a conflict among at least a first policy and a second policy that govern a policy-based system, comprising:

means for receiving the first policy and the second policy, wherein the first policy and the second policy are defined according to a formal policy definition;

means for verifying that the first policy and the second policy each conform to the formal policy definition, wherein the means for verifying comprise:

means for verifying that the first policy and the second policy each contain exactly one condition; and means for verifying that each condition expresses one or more Boolean relations among one or more condition categories and one or more condition elements;

means for testing whether the first policy and the second policy conflict, according to a set of conflict tests; and means for resolving the conflict among the policies, when the first policy and the second policy conflict.

25. The apparatus recited in claim 24, wherein each policy comprises at least one consequent for each condition.

26. The apparatus recited in claim 25, wherein the at least one consequent indicates one of the following: to allow information to pass through the policy-based system; to deny information from passing through the policy-based system; to mark information passing through the policy-based system; or to initiate a service.

27. The apparatus recited in claim 25, wherein the at least one consequent identifies a state that is to be established when the condition is satisfied.

28. The apparatus recited in claim 25, wherein the at least one consequent identifies an action that is to be taken or attempted when the condition is satisfied.

29. The apparatus recited in claim 24, wherein the means for testing comprises:

means for identifying the conflict when a first condition of the first policy and a second condition of the second policy may be simultaneously true and when a first consequent of the first policy and a second consequent of the second policy may not be carried out simultaneously.

30. The apparatus recited in claim 24, wherein the means for resolving comprises:

means for displaying information that describes the conflict; and means for receiving modification information that modifies the first policy or the second policy so as to eliminate the conflict.

31. The apparatus recited in claim 24, wherein the means for resolving comprises:

means for displaying information that describes the conflict; and means for receiving precedence information that identifies whether the first policy or the second policy shall take precedence over the other.

32. An apparatus for recognizing and resolving a conflict in a network management system among at least a first network management policy and a second network management policy that govern operation of a network, comprising the computer-implemented steps of:

means for receiving the first network management policy and the second network management policy, wherein the first network management policy and the second network management policy are defined according to a formal policy definition;

means for verifying that the first network management policy and the second network management policy each conform to the formal policy definition, wherein the means for verifying comprises:

means for verifying that the first network management policy and the second network management policy each contain exactly one condition; and means for verifying that each condition expresses one or more Boolean relations among one or more condition categories and one or more condition elements;

means for testing whether the first network management policy and the second network management policy conflict, according to a set of conflict tests; and means for resolving the conflict among the network management policies, when the first network management policy and the second network management policy conflict.

33. The apparatus recited in claim 32, wherein each network management policy comprises at least one consequent for each condition, and wherein the at least one consequent indicates one of the following: to allow information to pass through the network; to deny information from passing through the network; to mark information passing through the network; or to initiate a network service.

34. The apparatus recited in claim 32, wherein the means for testing comprises:

means for identifying the conflict when a first condition of the first network management policy and a second condition of the second network management policy may be simultaneously true and when a first consequent of the first network management policy and a second consequent of the second network management policy may not be carried out simultaneously.

35. The apparatus recited in claim 32, wherein the means for resolving comprises:

means for displaying information that describes the conflict; and means for receiving modification information that modifies the first network management policy or the second network management policy so as to eliminate the conflict, or receiving precedence information that identifies whether the first network management policy or the second network management policy shall take precedence over the other.

36. An apparatus for recognizing and resolving a conflict in a network management system among at least a first network management policy and a second network management policy that govern operation of a network, comprising the computer-implemented steps of:

a network interface;

a processor coupled to the network interface and receiving information from the network interface;

one or more stored sequences of instructions which, when executed by the processor, cause the processor to carry out the steps of:

receiving the first network management policy and the second network management policy, wherein the first network management policy and the second network management policy are defined according to a formal policy definition;

verifying that the first network management policy and the second network management policy each conform to the formal policy definition by performing the steps of:

verifying that the first network management policy and the second network management policy each contain exactly one condition; and verifying that each condition expresses one or more Boolean relations among one or more condition categories and one or more condition elements;

testing whether the first network management policy and the second network management policy conflict, according to a set of conflict tests; and when the first network management policy and the second network management policy conflict, resolving the conflict among the network management policies.

37. The apparatus recited in claim 36, wherein each network management policy comprises at least one consequent for each condition, and wherein the consequent indicates one of the following: to allow information to pass through the network; to deny information from passing through the network; to mark information passing through the network; or to initiate a network service.

38. The apparatus recited in claim 36, wherein the instructions for testing further comprise instructions which, when executed by the processor, cause the processor to carry out the steps of:

identifying the conflict when a first condition of the first network management policy and a second condition of the second network management policy may be simultaneously true and when a first consequent of the first network management policy and a second consequent of the second network management policy may not be carried out simultaneously.

39. The apparatus recited in claim 36, wherein the instructions for resolving further comprise instructions which, when executed by the processor, cause the processor to carry out the steps of:

displaying information that describes the conflict; and receiving modification information that modifies the first network management policy or the second network management policy so as to eliminate the conflict, or receiving precedence information that identifies whether the first network management policy or the second network management policy shall take precedence over the other.

\* \* \* \* \*